United States Patent
Fehn et al.

[11] 3,966,061
[45] June 29, 1976

[54] APPARATUS FOR INSTALLING AND REMOVING THE DRIVE ASSEMBLY IN CHAIN DRIVEN-VEHICLES

[75] Inventors: Berthold Fehn, Lintorf; Oskar Simon, Essen, both of Germany

[73] Assignee: Gesellschaft fur Systemtechnik mbH, Dusseldorf, Germany

[22] Filed: Jan. 30, 1975

[21] Appl. No.: 545,714

[30] Foreign Application Priority Data
Feb. 11, 1974 Germany............................ 2406330

[52] U.S. Cl............................ 214/38 D; 214/83.24; 180/64 L
[51] Int. Cl.²......................................... B65G 67/02
[58] Field of Search............. 180/64 L, 64 M, 64 R; 214/83.24, 110, 512

[56] References Cited
UNITED STATES PATENTS
2,035,212   3/1936   Alborn............................ 180/64 L 3,829,064   8/1974   Jackson........................... 214/83.24

FOREIGN PATENTS OR APPLICATIONS
1,135,051   11/1968   United Kingdom.............. 214/83.24

*Primary Examiner*—Robert J. Spar
*Assistant Examiner*—James M. Slattery
*Attorney, Agent, or Firm*—Spencer & Kaye

[57] ABSTRACT

A system for the removal and replacement of the drive assembly of a chain-driven vehicle, composed of guides within the vehicle, a device for lifting the drive assembly onto the guides and including rollers via which the drive assembly is supported on the guides when lifted thereon, an auxiliary rack temporarily attachable to the rear of the vehicle to form a rearwardly-projecting extension of the guides on which the rollers can travel, and a device for moving the drive assembly through an opening in the rear of the vehicle and over the auxiliary track.

1 Claim, 4 Drawing Figures

3,966,061

APPARATUS FOR INSTALLING AND REMOVING THE DRIVE ASSEMBLY IN CHAIN DRIVEN-VEHICLES

BACKGROUND OF THE INVENTION

The present invention relates to an apparatus for installing and removing the drive assembly of chain-driven vehicles.

With chain-driven vehicles it is often necessary, in order to make repairs to the drive assembly, to remove the drive assembly from the vehicle so that it will be accessible from all sides. In known chain driven vehicles, such as removal of the drive assembly is effectuated either toward the top or toward the rear.

When the removal takes place toward the rear, the entire rear end of the vehicle must be disassembled and the parts connected to the drive assembly must be removed. Moreover, either heavy lifting means, for example salvage vehicles with crane booms or hall cranes, are required to remove the drive assembly, or a completely level platform must be provided in order to support the rear end of the vehicle and the drive assembly during removal from, or installation in, the chain-drive vehicle.

SUMMARY OF THE INVENTION

It is an object of the present invention to eliminate or minimize these difficulties and to simplify the removal and reinstallation of such drive assemblies.

The present invention solves the problem of installing and removing the drive assembly of chain-drive vehicles with simple means which can be provided on board the vehicle and which can be operated by the vehicle operating crew without difficulty. The invention also offers the advantage of requiring only a relatively small opening in the cradle of the vehicle for removal of the drive assembly so that the cradle retains its stabilitiy. Extensive auxiliary devices are not required. The installation and removal of the drive assembly can be accomplished quickly and easily wherever the ground in level and, which is of particular importance for military vehicles of this type, can be done using the vehicle iself as cover.

The objects according to the present invention are achieved by apparatus which includes means for raising the drive assembly on guide means provided in the interior of the cradle, and an auxiliary rack which can be fastened at the rear of the vehicle as an extension of the guide means so that the drive assembly can be removed from the vehicle through an opening in the rear of the vehicle and placed on the auxiliary rack.

The auxiliary rack may advisably include two supports which are provided with guides for the rollers of the drive assembly and which are connected together by transverse bars. These supports are fastened to holding means in the rear of the vehicle and their rear ends are connected by means of ropes with a suspension device in the chain-driven vehicle. The removal and installation device may comprise, for example, a cable winch whose guide rollers are disposed at the free ends of the two supports where they are connected with the suspension.

The partially sectional drawing shows an embodiment of the present invention at the rear of a chain-driven vehicle.

DESCRIPTION OF THE PREFERRED EMBODIMENTS

Figure 1:
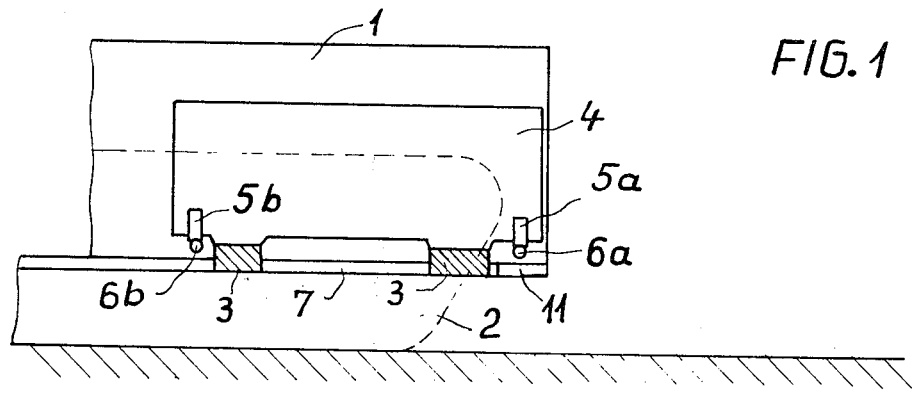
FIG. 1 is a simplified pictorial view of the rear part of a chain-driven vehicle with the drive assembly built in, according to the invention.

Referring first to FIG. 1, there is shown the drive assembly 4 for the chain-driven vehicle, the drive assembly including the engine, gears and auxiliary assemblies. Assembly 4 is disposed on a base plate 3 in the rear of the cradle 1 of a chain-driven vehicle which is driven by a chain drive mechanism 2.

At the sides of the drive assembly 4, lifting devices 5a and 5b are provided which may be operated hydraulically and which are provided with rollers 6a and 6b via which the drive assembly 4 can be supported on guide rails 7 provided at the bottom of cradle 1.

Figure 2:
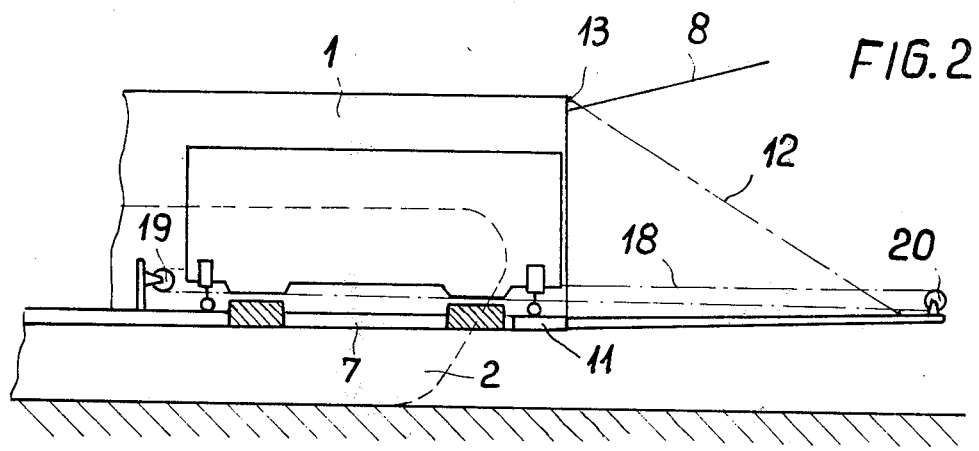
FIG. 2 is a view similar to that of FIG. 1, showing the chain-driven vehicle of FIG. 1 with the auxiliary rack attached thereto.
Figure 4:
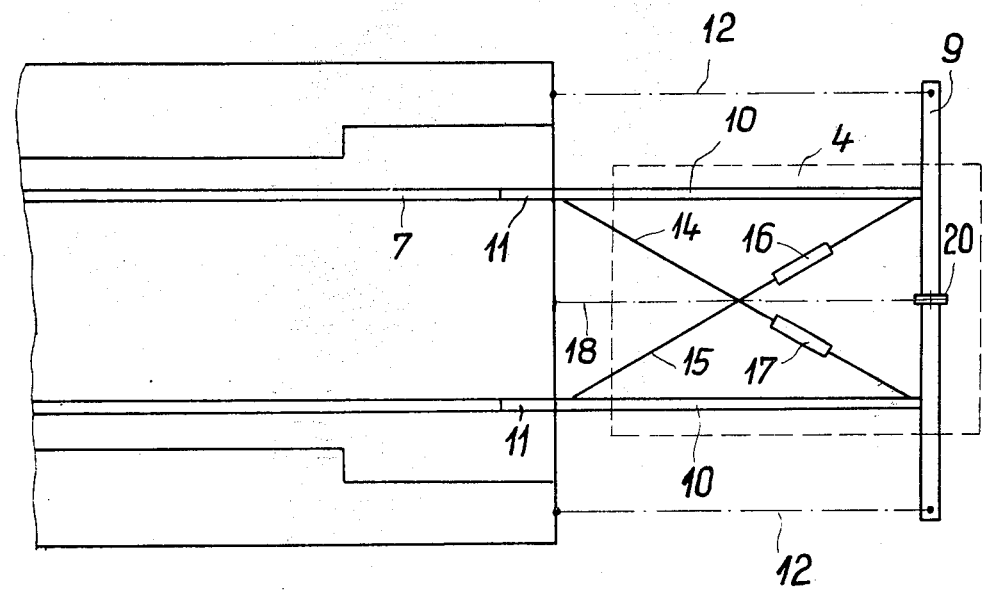
FIG. 4 is a plan view of the auxiliary rack shown in FIGS. 2 and 3.

As may be seen in FIG. 2, a flap 8 is provided at the rear of cradle 1 and is arranged to be opened to present an opening for the removal of the drive assembly to an auxiliary rack. Referring to FIG. 4, the auxiliary rack includes two longitudinal supports 10 which are connected together by means of a cross member 9 and which are fastened in mounts 11 provided at the underside of cradle 1, for example in that they are inserted into these mounts. The cross member 9 is suspended by means of ropes 12 in suspending devices 13 provided for this purpose at the upper edge of the cradle. Diagonal reinforcements 14 and 15, which may include, for example, chains or ropes provided with respective tensioning devices 16 and 17, serve to assure sufficient lateral stability of the auxiliary rack.

The drive assembly can be removed from the interior of the cradle by means of a cable winch, with the cable 18 being guided over roller 19 provided in the interior of the cradle and roller 20 disposed at the cross member 9. The cable winch may be driven, for example, by an auxiliary drive provided on board the vehicle.

In order to remove the drive assembly 4 the flap 8 is initially opened and the auxiliary rack is mounted to the rear of the vehicle, for example by inserting the longitudinal supports 10 into mounts 11 on the underside of cradle 1 and by fastening ropes 12 to the cross members 9 and the suspending means 13. Then the attachment of the drive assembly to the base plate 3 is released and the lifting devices 5a and 5b are actuated so that the drive assembly can be moved over guide rail 7. The system is then in the state shown in FIG. 2.

Figure 3:
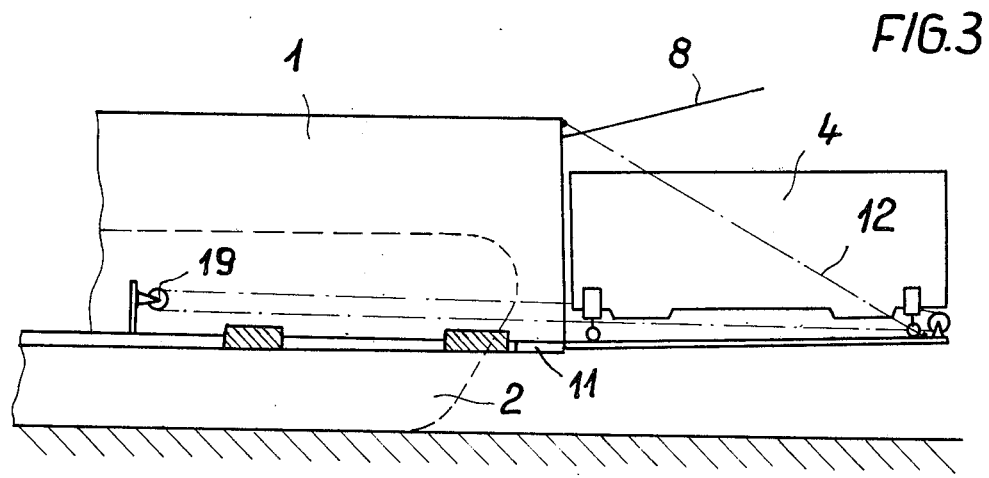
FIG. 3 is a view similar to that of FIG. 1 showing the chain-driven vehicle of FIGS. 1 and 2 with the drive assembly removed to the auxiliary rack.

The drive assembly can be removed from the interior of the cradle 1 onto the longitudinal supports 10 by means of the cable winch, to the position shown in FIG. 3, to the extent that the drive area in the cradle 1 becomes freshly accessible. The drive assembly 4 is then also freely accessible from all sides so that the required maintenance and repair work can be effected without difficulty in the cover of the vehicle itself. In case it is necessary to replace the drive assembly 4, the latter can be lifted from the auxiliary rack without difficulty. The reinstallation of the repaired drive assembly 4, or installation of a replacement assembly, is effected in the reverse order.

It will be understood that the above description of the present invention is susceptible to various modifications, changes and adaptations, and the same are intended to be comprehended within the meaning and range of equivalents of the appended claims.

We claim:

1. Apparatus for installing and removing the drive assembly of a chain-drive vehicle having an opening at its rear and provided with a cradle and a chain drive mechanism, comprising: giuide means disposed in the interior of the cradle; means composed of rollers arranged to engage on said guide means for lifting the drive assembly onto said guide means; means defining an auxiliary rack temporarily attachable to the rear of the vehicle to form a rearwardly-projecting extension of said guide means, said auxiliary rack being composed of two supports provided with guides for said rollers and a cross member connected between said supports; mounting devices at the rear of the vehicle for fastening said supports to the vehicle at those ends of said supports which are adjacent the vehicle when said rack is temporarily attached to form such extension; a suspension device carried at the rear of the vehicle and including load supporting elements arranged to be connected to that end of said rack which is remote from the vehicle when said rack is temporarily attached to form such extension for supporting the entire load presented by such end of said rack which is remote from the vehicle and by the drive assembly on the rack, thereby to maintain said rack stationary relative to the vehicle; and means for moving the drive assembly through the opening in the rear of the vehicle onto the auxiliary rack.

* * * * *